(12) United States Patent
Valkaitis

(10) Patent No.: US 11,777,904 B2
(45) Date of Patent: ***Oct. 3, 2023

(54) HEADER-BASED AUTHENTICATION IN A VIRTUAL PRIVATE NETWORK

(71) Applicant: UAB 360 IT, Vilnius (LT)

(72) Inventor: Mindaugas Valkaitis, Vilnius (LT)

(73) Assignee: UAB 360 IT, Vilnius (LT)

( * ) Notice: Subject to any disclaimer, the term of this patent is extended or adjusted under 35 U.S.C. 154(b) by 4 days.

This patent is subject to a terminal disclaimer.

(21) Appl. No.: 17/517,628

(22) Filed: Nov. 2, 2021

(65) Prior Publication Data

US 2023/0136190 A1   May 4, 2023

Related U.S. Application Data

(63) Continuation of application No. 17/517,598, filed on Nov. 2, 2021, now Pat. No. 11,463,411.

(51) Int. Cl.
*H04L 9/40* (2022.01)
*H04L 9/32* (2006.01)

(52) U.S. Cl.
CPC ........ *H04L 63/0272* (2013.01); *H04L 9/3236* (2013.01); *H04L 9/3247* (2013.01); *H04L 63/0435* (2013.01); *H04L 63/08* (2013.01); *H04L 63/0876* (2013.01); *H04L 63/12* (2013.01)

(58) Field of Classification Search
CPC ............... H04L 63/0272; H04L 9/3247; H04L 63/0435; H04L 63/087
See application file for complete search history.

(56) References Cited

U.S. PATENT DOCUMENTS

| | | | | |
|---|---|---|---|---|
| 5,710,889 | A | * | 1/1998 | Clark ..................... G06Q 30/06 705/42 |
| 6,011,849 | A | * | 1/2000 | Orrin ....................... H04L 9/065 380/42 |
| 7,360,083 | B1 | | 4/2008 | Ragireddy et al. |
| 9,438,564 | B1 | | 9/2016 | Weng et al. |
| 9,747,434 | B1 | * | 8/2017 | Avital ..................... H04L 67/02 |
| 11,341,280 | B2 | * | 5/2022 | Ibrahim ................ H04L 9/0897 |
| 2003/0058870 | A1 | | 3/2003 | Mizrachi et al. |
| 2003/0061481 | A1 | | 3/2003 | Levine et al. |
| 2003/0172280 | A1 | * | 9/2003 | Scheidt .................. H04L 9/3247 713/182 |
| 2006/0010074 | A1 | * | 1/2006 | Zeitsiff .................. H04L 63/062 705/52 |
| 2008/0080525 | A1 | * | 4/2008 | Chatilov ............. H04L 65/1083 370/389 |

(Continued)

*Primary Examiner* — Ghodrat Jamshidi
(74) *Attorney, Agent, or Firm* — The Pattani Law Group

(57) ABSTRACT

A method in a virtual private network (VPN) environment, the method including receiving, by a processor, a connection request from a user device for obtaining VPN services; determining, by the processor based at least in part on receiving the connection request, custom headers including a timing header, an authorization header, a digest header, and a signature header; transmitting, by the processor to the user device, a response including the custom headers and a payload indicating a VPN server associated with obtaining the VPN services; and configuring, by the processor, the VPN server to provide the VPN services to the user device. Various other aspects are contemplated.

20 Claims, 6 Drawing Sheets

(56) References Cited

U.S. PATENT DOCUMENTS

| | | | |
|---|---|---|---|
| 2009/0190589 A1* | 7/2009 | Bains | H04L 69/323 370/392 |
| 2011/0296409 A1 | 12/2011 | Lo et al. | |
| 2015/0263966 A1* | 9/2015 | Blake | H04L 47/562 370/229 |
| 2015/0288690 A1 | 10/2015 | Pal | |
| 2017/0331789 A1* | 11/2017 | Kumar | H04L 63/0272 |
| 2017/0346807 A1* | 11/2017 | Blasi | H04L 63/126 |
| 2019/0057263 A1* | 2/2019 | Miville | G01S 13/865 |
| 2019/0273734 A1* | 9/2019 | Thakkar | H04L 9/088 |
| 2021/0168125 A1* | 6/2021 | Vemulpali | H04L 9/3236 |
| 2021/0409223 A1 | 12/2021 | Subramanian et al. | |
| 2023/0042508 A1* | 2/2023 | Agarwal | H04L 9/3247 |

\* cited by examiner

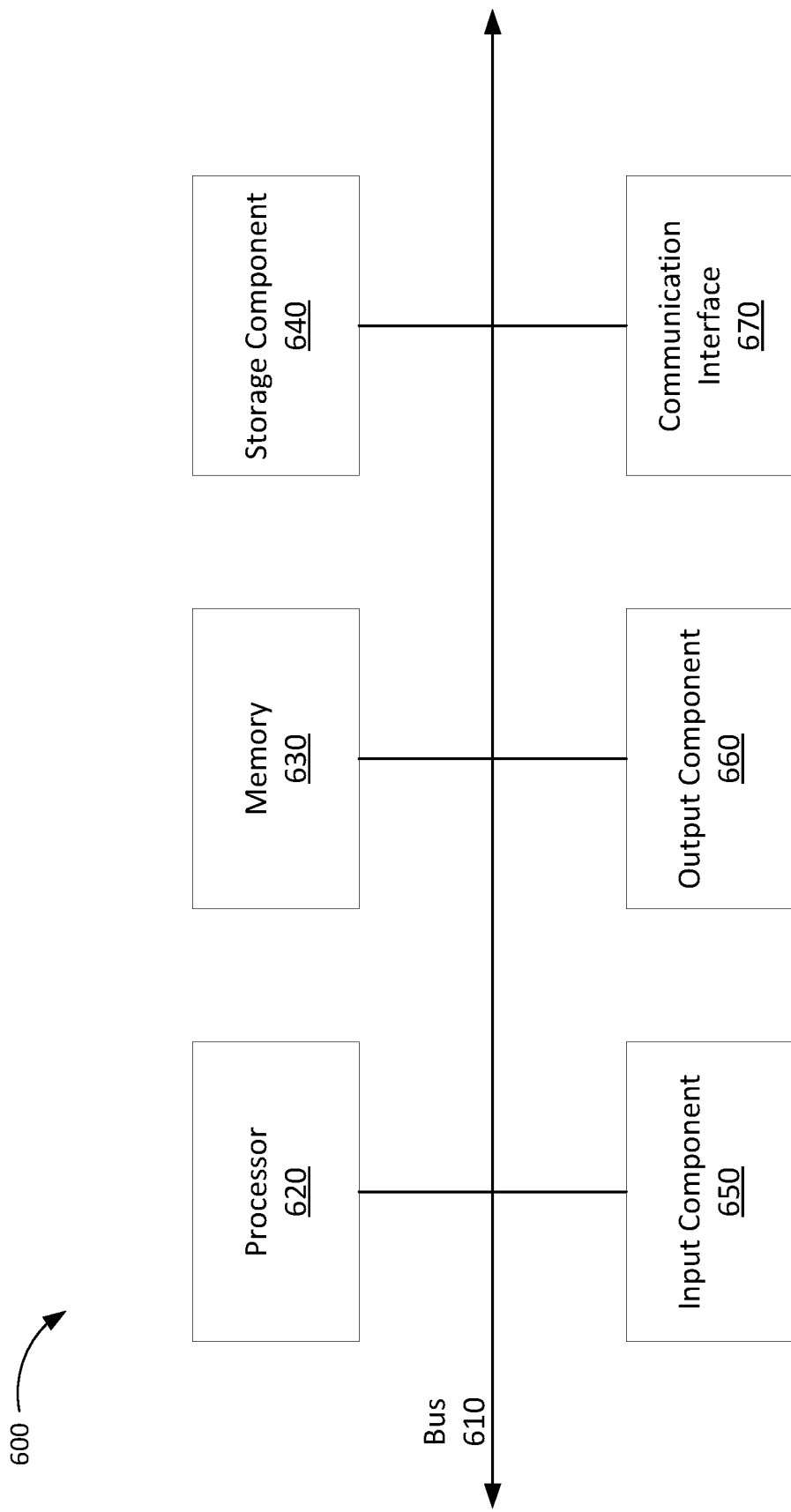

HEADER-BASED AUTHENTICATION IN A VIRTUAL PRIVATE NETWORK

CROSS REFERENCE

This application is a continuation of U.S. Non-Provisional patent application Ser. No. 17/517,598, filed on Nov. 2, 2021, and titled "Header-Based Authentication In A Virtual Private Network," the entire contents of which are incorporated herein by reference.

FIELD OF DISCLOSURE

Aspects of the present disclosure generally relate to a virtual private network (VPN), and more particularly to header-based authentication in a VPN.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encrypted, unreadable format with help of an encryption algorithm. Decryption may be associated with changing the data from being in the encrypted, unreadable format to being in the transparently readable format with help of a decryption algorithm. In an example, encrypted data may be decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated bits, and, when using a given encryption algorithm, the longer the length of the encryption key, the stronger is the encryption.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., a token provider to provide one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

SUMMARY

In one aspect, the present disclosure contemplates a method in a virtual private network (VPN) environment, the method including receiving, at a first processor from a second processor, a connection request for obtaining VPN services; determining, by the first processor, custom headers including a timing header, an authorization header, a digest header, and a signature header; transmitting, by the first processor to the second processor, a response including the custom headers and a payload indicating a VPN server for providing the VPN services; and transmitting, by the second processor to the VPN server, a request for obtaining the VPN services based at least in part on authenticating the custom headers.

In another aspect, the present disclosure contemplates a virtual private network (VPN) environment, comprising: a first processor configured to: receive, from a second processor, a connection request for obtaining VPN services; determine custom headers including a timing header, an authorization header, a digest header, and a signature header; and transmit, to the second processor, a response including the custom headers and a payload indicating a VPN server for providing the VPN services; and the second processor configured to: transmit, to the VPN server, a request for obtaining the VPN services based at least in part on authenticating the custom headers.

In another aspect, the present disclosure contemplates a non-transitory computer readable medium storing instructions, which when executed by a first processor associated with a virtual private network (VPN) environment, cause the first processor to: receive, from a second processor, a connection request for obtaining VPN services; determine custom headers including a timing header, an authorization header, a digest header, and a signature header; and transmit, to the second processor, a response including the custom headers and a payload indicating a VPN server for providing the VPN services; and when executed by the second processor, cause the second processor to: transmit, to the VPN server, a request for obtaining the VPN services based at least in part on authenticating the custom headers.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
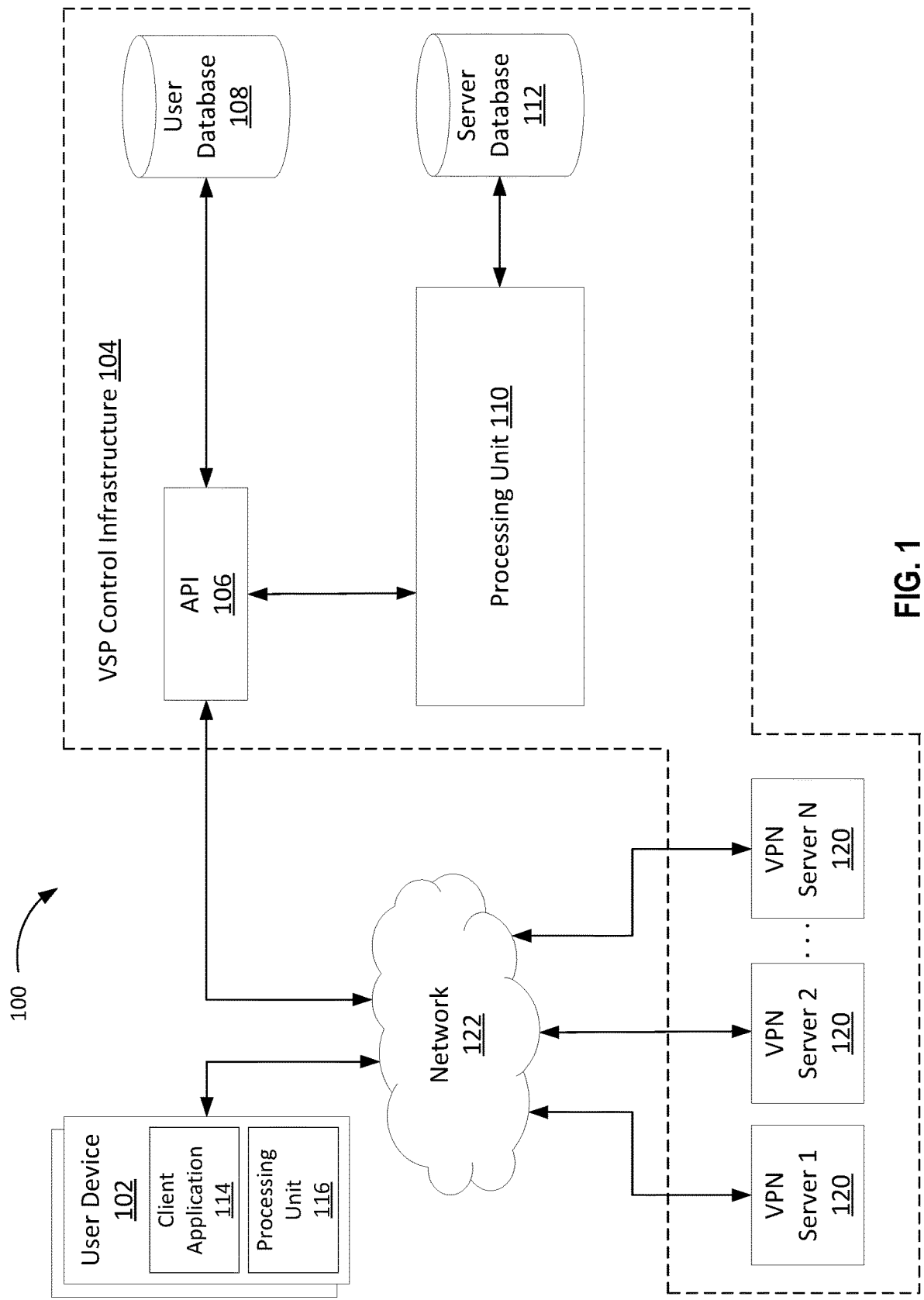

FIG. 1 is an illustration of an example system associated with header-based authentication in a VPN, according to various aspects of the present disclosure.

Figure 2:
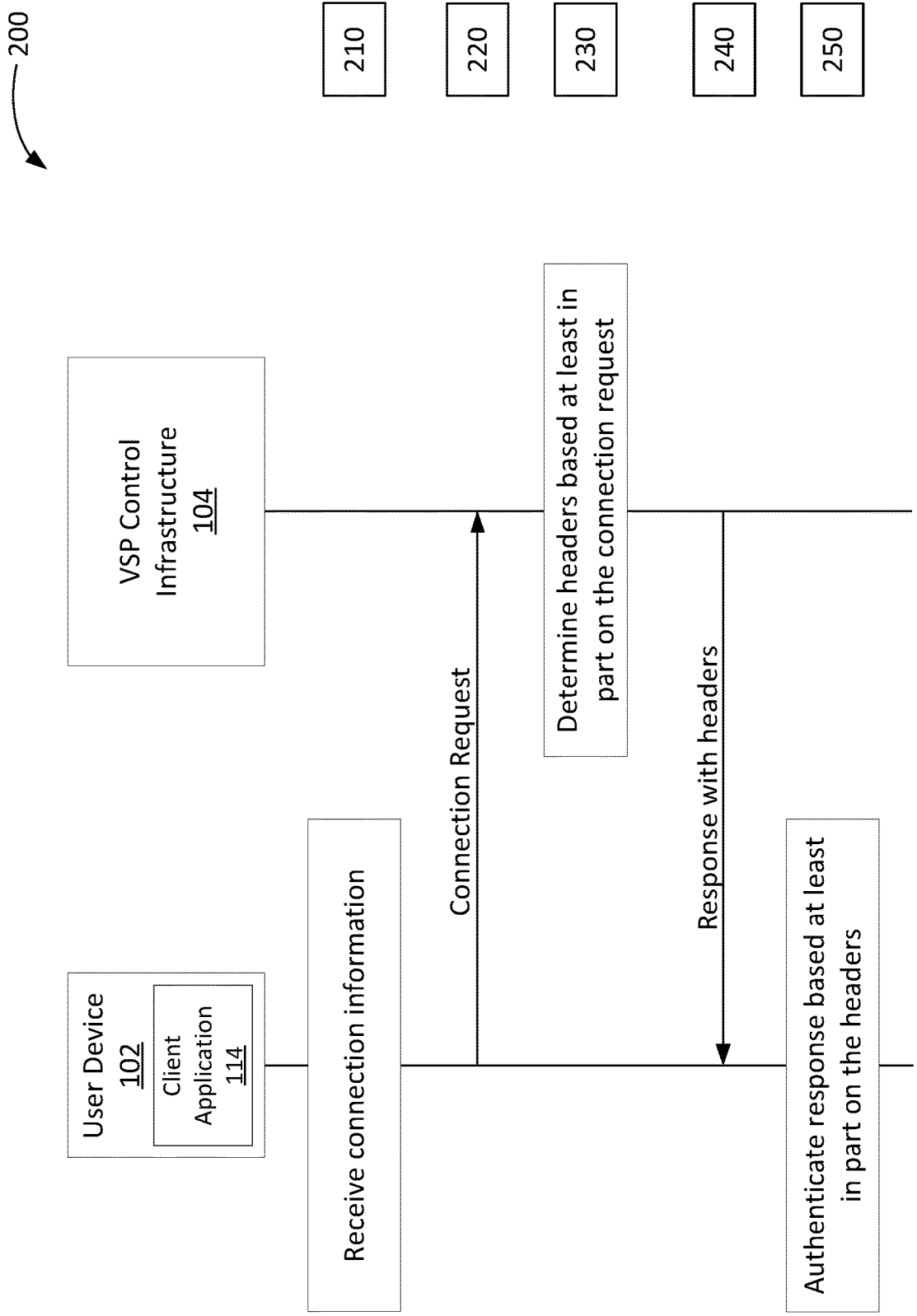

FIG. 2 is an illustration of an example flow associated with header-based authentication in a VPN, according to various aspects of the present disclosure.

Figure 3:
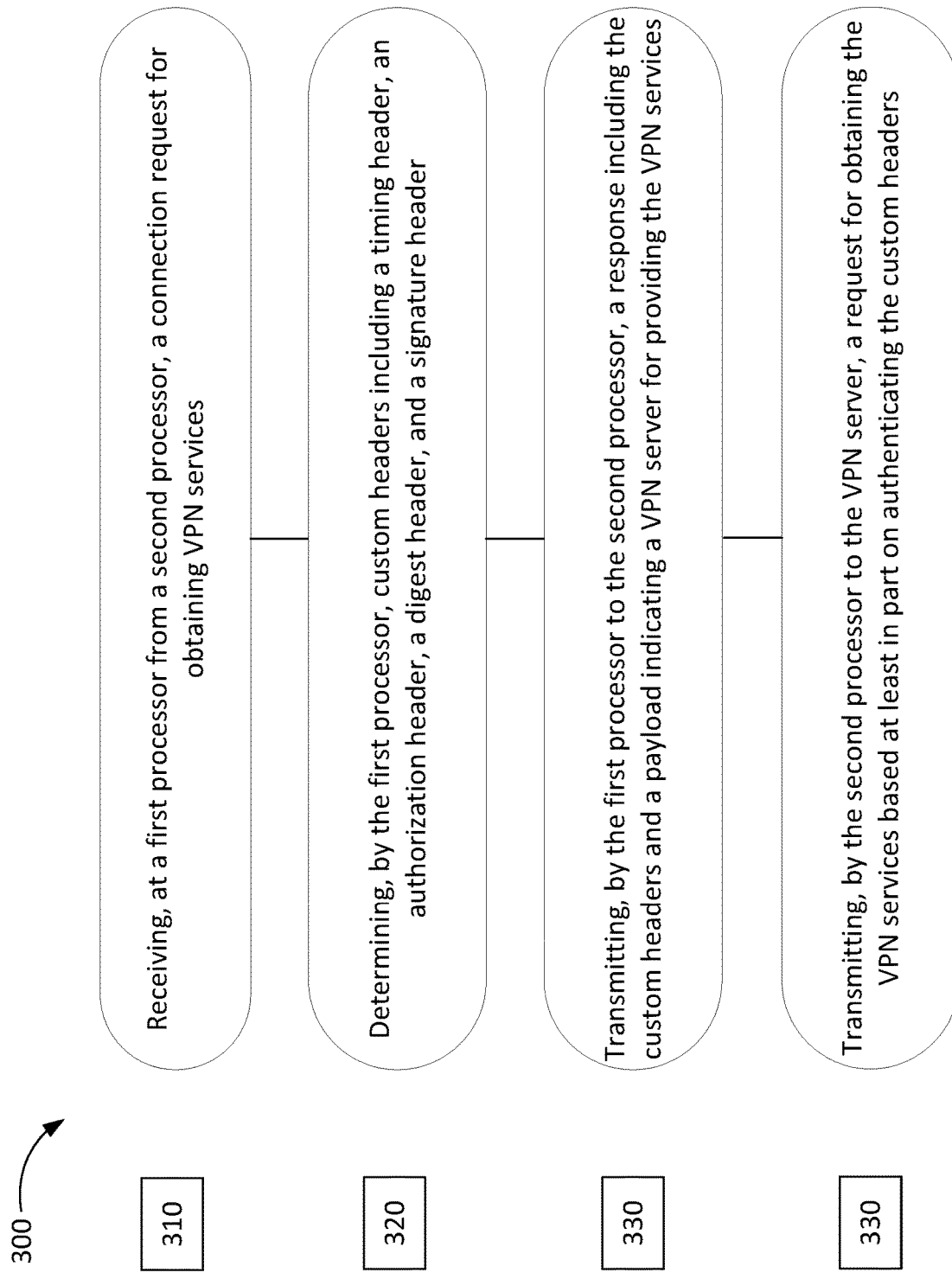

FIG. 3 is an illustration of an example process associated with header-based authentication in a VPN, according to various aspects of the present disclosure.

Figure 4:
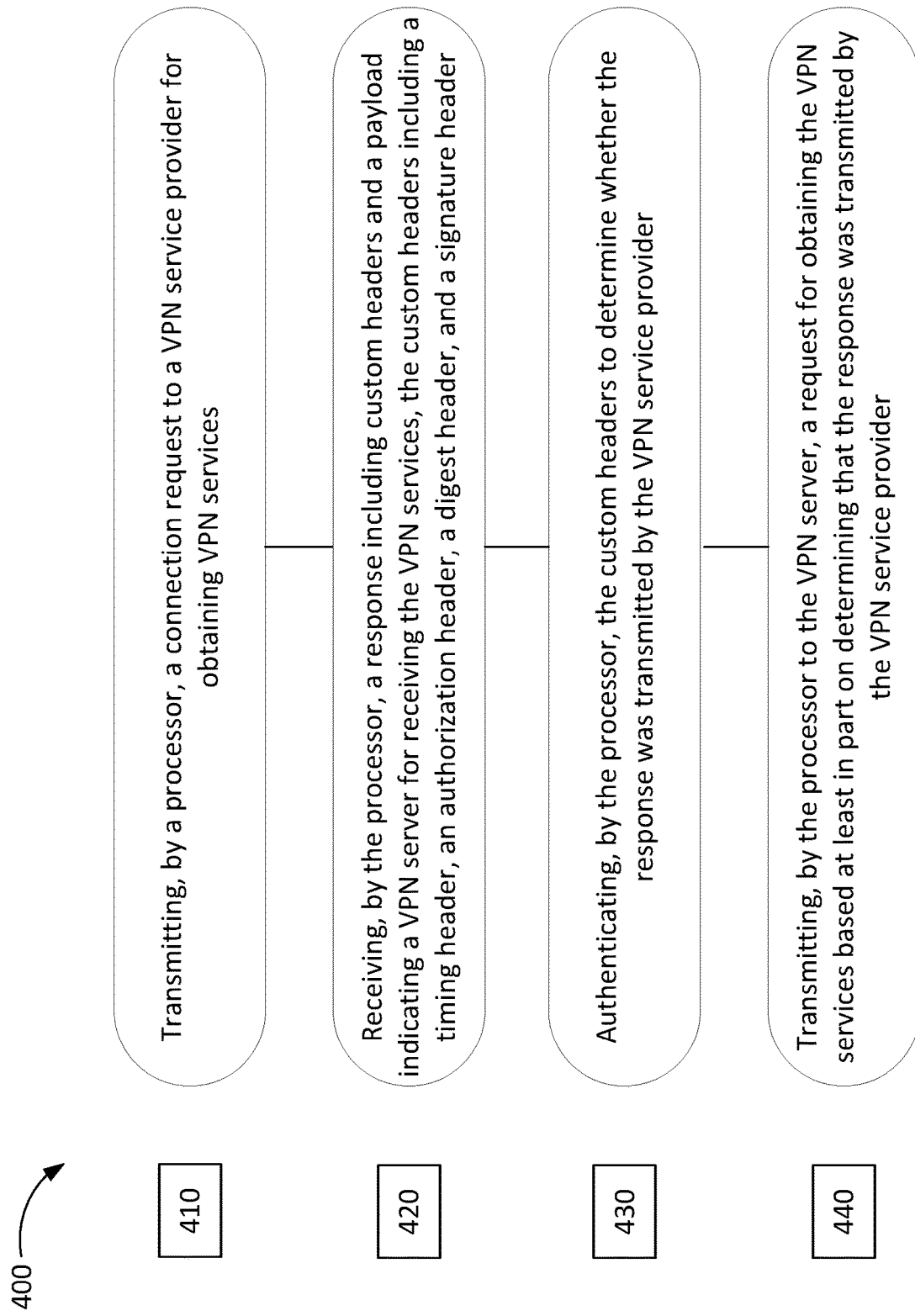

FIG. 4 is an illustration of an example process associated with header-based authentication in a VPN, according to various aspects of the present disclosure.

Figure 5:
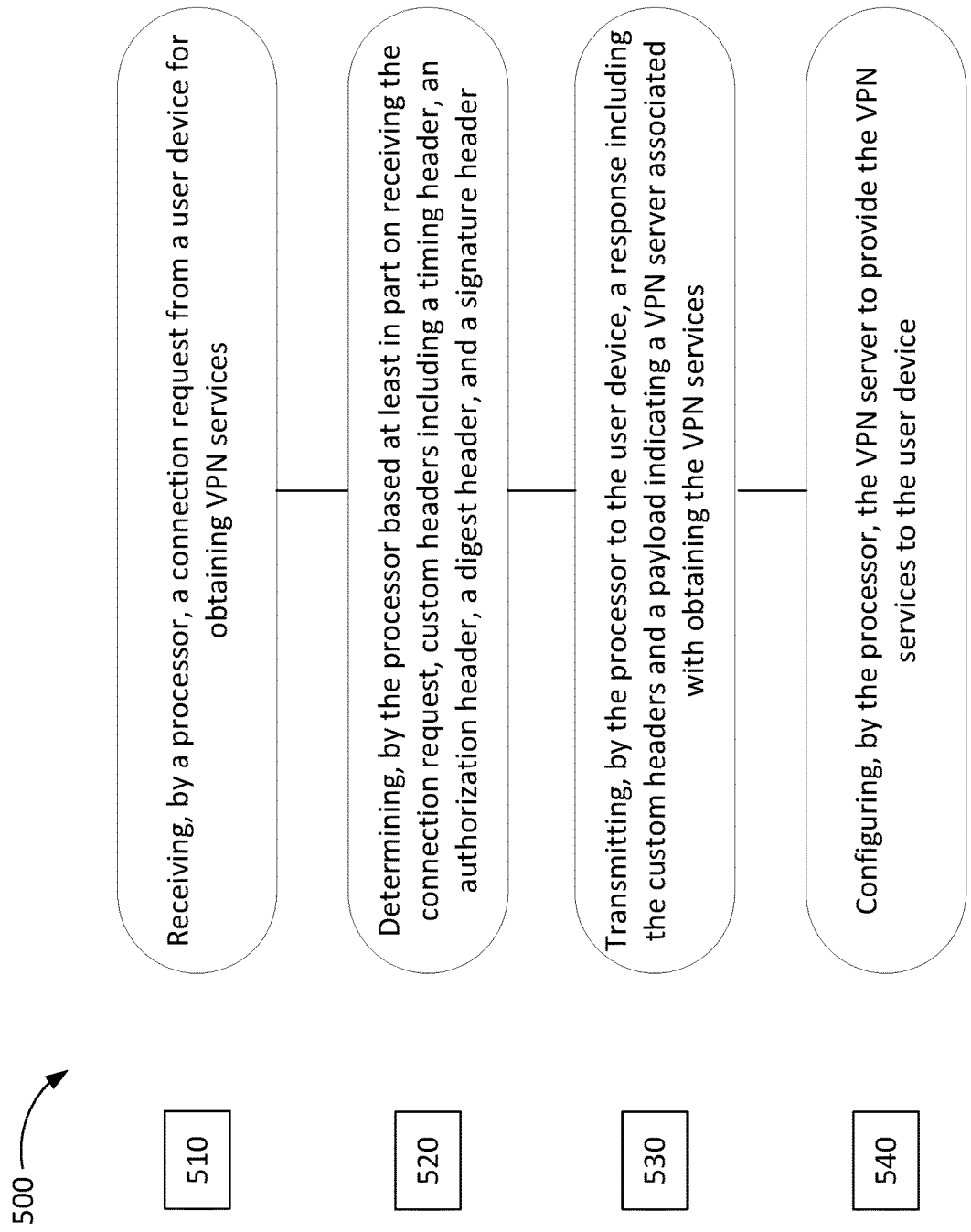

FIG. 5 is an illustration of an example process associated with header-based authentication in a VPN, according to various aspects of the present disclosure.

FIG. 6 is an illustration of example devices associated with header-based authentication in a VPN, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with header-based authentication in a VPN, according to various aspects of the present disclosure. Example 100 shows an architectural depiction of components included in system 100. In some aspects, the components may include a user device 102 capable of communicating with one or more VPN servers 120 and with a VPN service provider (VSP) control infrastructure 104 over a network 122. The VSP control infrastructure 104 may be controlled by a VPN service provider and may include an application programming interface (API) 106, a user database 108, processing unit 110, a server database 112, and the one or more VPN servers 120. In some aspects, the user device 102 may utilize a processing unit 116 and/or a client application 114, provided by the VSP control infrastructure 104, to communicate with the API 106. The API 106 may be capable of communicating with the user database 108 and with the processing unit 110. Additionally, the processing unit 110 may be capable of communicating with the server database 112, which may be capable of communicating with a testing module (not shown). The testing module may be capable of communicating with the one or more VPN servers 120 over the network 122. The processing unit 110 may be capable of controlling operation of the one or more VPN servers 120.

The user device 102 may be a physical computing device capable of hosting a VPN application and of connecting to the network 122. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 122 may be any digital telecommunication network that permits several nodes to share and access resources. In some aspects, the network 122 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 122, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The VPN service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may provide VPN services to the user device 102. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 a request for an IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal server or IP addresses of the VPN servers 120 included in the list to the user device 102. In the case where the list of IP addresses of the VPN servers 120 is provided, the user device 102 may have an option to select a single VPN server 120 from among the listed VPN servers as the optimal server 120. The user device 102 may transmit an initiation request to establish a VPN connection (e.g., an encrypted tunnel) with the optimal VPN server. In some aspects, the optimal VPN server with which the user device establishes the encrypted tunnel may be referred to as a primary VPN server or an entry VPN server. In some aspects, a VPN server 120 may be a piece of physical or virtual computer hardware and/or software capable of securely communicating with (the VPN application on) the user device 102 for provision of VPN services.

The processing unit 110 may be a logical unit including a scoring engine. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120.

In some aspects, based at least in part on server penalty scores calculated via the complex operations and/or the arithmetical and logical operations, the processing unit 110 may determine an optimal VPN server. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

One or more components (e.g., API 106, user database 108, processing unit 110, and/or server database 112) included in the VSP control infrastructure 104 and/or included in the user device 102 may further be associated with a controller/processor, a memory, a communication interface, or a combination thereof (e.g., FIG. 6). For instance, the one or more components of the set of components may include or may be included in a controller/processor, a memory, or a combination thereof. In some aspects, the one or more of the components included in the VSP control infrastructure 104 and/or the user device 102 may be separate and distinct from each other. Alternatively, in some aspects, one or more of the components included in the VSP control infrastructure 104 and/or the user device 102 may be combined with one or more of other components included in the VSP control infrastructure 104. In some aspects, the one or more of the components included in the VSP control infrastructure 104 and/or the user device 102 may be local with respect to each other. Alternatively, in some aspects, one or more of the components included in the VSP control infrastructure 104 and/or the user device 102 may be located remotely with respect to one or more of other components included in the VSP control infrastructure 104 and/or the user device 102. Additionally, or alternatively, one or more components of the components included in the VSP control infrastructure 104 and/or the user device 102 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

A user device may request VPN services from a VSP control infrastructure. To request the VPN services, the user device may transmit, via a client application installed on the user device, a connection request to an API associated with the VSP control infrastructure. The client application may utilize a domain name services (DNS) server to resolve connection information associated with the VSP control infrastructure provided by the user device and to return an Internet protocol (IP) address associated with the API. Based on determining the IP address via the DNS server, the client application may transmit the connection request to the API. The API may process the connection request and enable the user device to obtain the VPN services.

In some cases, the API associated with the VSP control infrastructure may fail to receive the connection request transmitted by the client application. In an example, the connection request may fail to reach the API. For instance, the DNS server may be associated with an Internet Service Provider (ISP) providing network services to the user device, and a malicious third party may have hacked into the ISP's infrastructure and/or may have manipulated the DNS server to return an IP address to a destination other than the API associated with the VSP control infrastructure. In such situations, the DNS server may receive the connection information associated with the VSP service provider from the client application and may return an IP address to a different API.

As a result, the client application may unknowingly transmit the connection request to the different API instead of transmitting the request to the API associated with the VSP control infrastructure. Further, the client application may receive a response from the different API associated with obtaining VPN services (e.g., information to connect to a different VPN server other than a VPN server associated with the VSP control infrastructure). Based at least in part on receiving the response, the client application may unknowingly connect with the different VPN server and may unknowingly receive VPN services from the different VPN server instead of receiving the VPN services from a VPN server associated with the VSP control infrastructure.

While receiving such VPN services, the client application may provide private information associated with the user device (e.g., a location of the user device, a list of websites visited using the user device, a nature of data requested by the user device, or the like) to the different API. Further, the different VPN server may include a text file (e.g., a cookie) in data received by the client application, which text file may get stored on the user device and may enable the different VPN server to discover and track the private information associated with the user device. As a result, privacy of the user device may be compromised, and the user device may be unable to, among other things, privately send and receive data across public networks. In another example, the different VPN server may introduce malware in data received by the client application, the malware being designed to disrupt, damage, and/or gain unauthorized access to the user device. The malware may also adversely affect the operating system of the user device such that the operating system may run slower and/or associated circuitry may emit excessive heat and/or noise, thereby causing damage to the user device. The user device may expend various user device resources (e.g., processing resources, memory resources, power consumption resources, battery life, or the like) in efforts to mitigate effects of the private information becoming compromised and issues caused by the malware.

Various aspects of systems and techniques discussed in the present disclosure enable header-based authentication in a VPN. In some aspects, a client application installed on a user device may transmit a connection request to an API associated with a VSP control infrastructure for obtaining VPN services and may receive a response from the API. In some aspects, the response may be in a hypertext transfer protocol (HTTP) format. Further, the response from the API may include custom headers. The client application may authenticate the custom headers by inspecting the content included in the custom headers (e.g., header-based authentication). Based at least in part on such header-based authentication, the client application may determine that the response is transmitted by the API associated with the VSP control infrastructure. In this case, the client application may connect with a VPN server associated with the VSP control infrastructure to obtain the VPN services. When the client application fails to detect or to authenticate the custom headers, the client application may determine that the response is from a different API, other than the API associated with the VSP control infrastructure. In this case, the client application may refrain from unknowingly connecting with a different VPN server associated with the different API and from unknowingly sharing private information with the different VPN server. In this way, the header-based authentication discussed herein may mitigate chances of the private information associated with the user device from becoming compromised and of malware being introduced to the user device. As a result, the user device may avoid expending various user device resources (e.g., processing resources, memory resources, power consumption resources, battery life, or the like) in efforts to mitigate effects of the private information becoming compromised and the malware being introduced to the user device.

In some aspects, a virtual private network (VPN) environment may include a first processor configured to: receive, from a second processor, a connection request for obtaining VPN services; determine custom headers including a timing header, an authorization header, a digest header, and a signature header; and transmit, to the second processor, a response including the custom headers and a payload indicating a VPN server for providing the VPN services; and the second processor configured to: transmit, to the VPN server, a request for obtaining the VPN services based at least in part on authenticating the custom headers.

FIG. 2 is an illustration of an example flow 200 associated with header-based authentication in a VPN, according to various aspects of the present disclosure. The example flow 200 may include a user device 102 in communication with a VSP control infrastructure 104 for purposes of obtaining VPN services. In some aspects, the user device 102 may utilize an installed client application 114, provided by the VSP control infrastructure 104, to communicate with an API 106 associated with the VSP control infrastructure 104. The client application 114 and the API 106 may communicate over a network (e.g., network 122). In some aspects, as discussed elsewhere herein, the VSP control infrastructure may enable the user device 102 to obtain the VPN services.

As shown by reference numeral 210, the client application 114 may receive connection information associated with the VSP control infrastructure 104. In an example, the connection information may include information such as a domain name, a network address, and/or a uniform resource locator (URL) link correlated to an IP address associated with the API 106 associated with the VSP control infrastructure 104. In some aspects, the client application 114 may utilize the connection information to transmit a connection request to the VSP control infrastructure 104 for purposes of obtaining the VPN services.

In some aspects, the VSP control infrastructure 104 may provide the client application 114 to be installed on the user device 102. The client application 104 may enable the user device 102 to receive the connection information to be processed by the client application 104 and/or by the VSP control infrastructure 104. The client application 104 may include a graphical interface to receive the connection information via a local input interface (e.g., touch screen, keyboard, mouse, pointer, etc.) associated with the user device 102. The connection information may be received via text input or via a selection from among a plurality of options (e.g., pull down menu, etc.). In some aspects, the client application 114 may activate and/or enable, at a time associated with transmitting the connection request, the graphical interface for receiving the connection information. For instance, the client application 114 may cause a screen (e.g., local screen) associated with the user device 102 to display, for example, a pop-up message to request entry of the connection information. Further, the client application 104 may enable transmission of at least a portion of the connection information to the VSP control infrastructure 104. As shown by reference numeral 220, the client application 114 may transmit, and the API 106 may receive, the connection request.

Based at least in part on receiving the connection request, as shown by reference numeral 220, the VSP control infrastructure 104 may determine one or more custom headers to be included in a response to the connection request. The one or more custom headers may include, for example, a digest header (e.g., X-Digest), a timing header (e.g., X-Timing), a signature header (e.g., X-Signature), and/or an authorization header (e.g., X-Authorization).

To determine the digest header, the VSP control infrastructure 104 may determine a payload. In one example, the payload may include data such as, for example, information associated with one or more VPN servers (e.g., entry IP addresses, locations, etc. associated with the VPN servers) that may enable the user device 102 to obtain the VPN services. In another example, the payload may include a set of alphanumeric characters predetermined by the VSP control infrastructure 104 and the client application 114. In some aspects, the set of alphanumeric characters may be a unique set of predetermined alphanumeric characters known to the client application 114 and/or the VSP control infrastructure 104. The VSP control infrastructure 104 may provide the set of alphanumeric characters to the user device 102 along with the client application 114. In some aspects, the set of alphanumeric characters may be included within (e.g., hardcoded in) the client application 114. In some aspects, the set of alphanumeric characters may identify an association of the user device 102 with the VSP control infrastructure 104 (e.g., account number, type of services to be provided by the VSP control infrastructure 104 to the user device 102, etc.). In some aspects, the string of alphanumeric characters may identify the client application 114 and/or the API 106 associated with the VSP control infrastructure 104. Further, the VSP control infrastructure 104 may utilize a hash function to hash the payload. The hash function may utilize hash algorithms such as, for example, SHA-256, SHA-1, SHA-2, MD5, NTLM, LANMAN, or the like. The digest header may include the hash of the payload.

To determine the timing header, the VSP control infrastructure 104 may utilize a UNIX time system (e.g., Epoch time, Posix time, etc.) to describe a point in time. In some aspects, the timing header may be associated with a point in time that indicates whether a response (from the VSP control infrastructure 104) including the timing header is valid. In an example, when the timing header is an accept-before timing header, the point in time may indicate an expiration of a validity of the response including the timing header. For instance, the point in time described in the accept-before timing header may indicate to the client application 114 that the response is valid when the response is received by the client application 114 before the point in time indicated in the accept-before timing header and is invalid when the response is received by the client application 114 after the point in time indicated in the accept-before timing header. In another example, to determine the timing header, the VSP control infrastructure 104 may describe a duration of time. In some aspects, when the timing header is a duration timing header, the duration of time may indicate an expiration of a validity of the response including the timing header. For instance, the duration of time described in the duration timing header may indicate to the client application 114 that the response is valid when the response is received by the client application 114 during the duration of time indicated in the duration timing header and is invalid when the response is received by the client application 114 before or after the duration of time indicated in the duration timing header.

To determine the signature header, the VSP control infrastructure 104 may utilize a combination of the digest header and the timing header. For instance, the VSP control infrastructure 104 may combine alphanumeric characters associated with the digest header and numeric characters associated with the timing header to determine a combined set of alphanumeric characters (e.g., X-Digest+X-Timing). Also, the VSP control infrastructure 104 may hash the combined set of alphanumeric characters using a hash function (e.g., hash(X-Digest+X-Timing)), as discussed elsewhere herein. For instance, the VSP control infrastructure 104 may utilize the SHA-256 hash function to hash the combined set of alphanumeric characters (e.g., SHA256(X-Digest+X-Timing)). Further, the VSP control infrastructure 104 may utilize an asymmetric key pair (e.g., cryptographic key pair), including a public key and an associated private key, to sign the result of hashing the combined set of alphanumeric characters. For instance, the VSP control infrastructure 104 may utilize a private key to sign the result of hashing the combined set of alphanumeric characters. In some aspects, the VSP control infrastructure 104 may utilize an encryption algorithm such as, for example, the RSA encryption algorithm (e.g., RSA(SHA256(X-Digest+X-Timing))) to sign the hash. Furthermore, the VSP control infrastructure 104 may utilize a binary-to-text encoding scheme to encode the signed hash. In some aspects, the VSP control infrastructure may utilize, for example, the Base64 encoding scheme (e.g., Base64(RSA(SHA256(X-Digest+X-Timing)))). The signature header may include the encoded signed hash.

To determine the authorization header, the VSP control infrastructure 104 may determine an identifier associated with the encryption algorithm used to sign the hashed combined set of alphanumeric characters. For instance, when the VSP control infrastructure 104 signs the hashed combined set of alphanumeric characters utilizing the RSA encryption algorithm, the VSP control infrastructure 104 may determine an identifier (e.g., RSA-key-1) associated with the RSA encryption algorithm. In some aspects, the identifier may include an identification of the asymmetric key pair (e.g., key-1) indicating a version (e.g., version 1) of the private key utilized to sign the hashed combined set of alphanumeric characters and/or indicating a version (e.g., version 1) of the public key to be utilized to verify the signed hashed combined set of alphanumeric characters. Further, the VSP control infrastructure 104 may determine combined identifier (e.g., RSA-SHA256) to indicate the hash function and the encryption algorithm utilized to determine the signature header. The authorization header may include the identifier associated with the encryption algorithm and/or the combined identifier to indicate the hash function and the encryption algorithm (e.g., key-id=RSA-key-1, algorithm=RSA-SHA256).

Based at least in part on determining the custom headers, as shown by reference numeral 240, the VSP control infrastructure 104 may transmit the response including the custom headers. In some aspects, the response may include the payload in plain text format to be interpreted by the client application 114. In some aspects, the payload may include information associated with one or more VPN servers (e.g., entry IP addresses, locations, etc. associated with the VPN servers) that may enable the user device 102 to obtain the VPN services and/or the unique set of predetermined alphanumeric characters known to the client application 114.

As shown by reference numeral 250, the client application 114 may authenticate the response received from the VSP control infrastructure 104 based at least in part on the custom headers. To authenticate the response, the client application 114 may initially determine whether the response includes the custom headers. In other words, the client application may detect a presence of the custom headers in the response. In some aspects, the client application 114 may determine whether the response includes, for example, a digest header (e.g., X-Digest), a timing header (e.g., X-Timing), a signature header (e.g., X-Signature), and/or an authorization header (e.g., X-Authorization). When the client application 114 determines that the response does not include the custom headers, the client application 114 may determine that the response is from a different API, other than the API 106 associated with the VSP control infrastructure 104. In this case, the client application 114 may discard the response and may retransmit a new connection request to the API 106 associated with the VSP control infrastructure 104.

Alternatively, when the client application 114 determines that the response includes the custom headers, the client application 114 may determine whether the response is valid (e.g., transmitted by the VSP control infrastructure 104) based at least in part on the timing header. In an example, when the timing header is an accept-before timing header, the client application 114 may determine whether the response is received before the point in time indicated in the accept-before timing header. When the client application 114 determines that the response is not received before the point in time indicated in the accept-before timing header, the client application 114 may determine that the response is invalid. In this case, the client application 114 may discard the response and may retransmit a new connection request to the API 106 associated with the VSP control infrastructure 104. In another example, when the timing header is a duration timing header, the client application 114 may determine whether the response is received during the duration of time indicated in the accept-before timing header. When the client application 114 determines that the response is not received during the duration of time (e.g., response is received before or after the duration of time) indicated in the duration timing header, the client application 114 may determine that the response is invalid. In this case, the client application 114 may discard the response and may retransmit a new connection request to the API 106 associated with the VSP control infrastructure 104.

Alternatively, when the client application 114 determines that the response is received before the point in time indicated in the accept-before timing header or during the duration of time indicated in the duration timing header, the client application 114 may inspect the authorization header. In some aspects, the client application 114 may receive a plurality of responses before the point in time indicated in the accept-before timing header or during the duration of time indicated in the duration timing header. In this case, the client application 114 may accept the latest-received response and may discard the earlier received responses. In an example, the client application 114 may update a list of VPN servers included in a first received response with a list of VPN servers included in a later received response.

While inspecting the authorization header, in some aspects, the client application 114 may inspect the combined identifier to determine the hash function and the encryption algorithm utilized by the VSP control infrastructure 104 to determine the signature header and/or the digest header. In an example, based at least in part on examining the combined identifier, the client application 114 may determine that, for example, the SHA-256 hash function and the RSA encryption algorithm were utilized by the VSP control infrastructure 104.

Based at least in part on determining that the SHA-256 hash function was utilized by the VSP control infrastructure 104, the client application 114 may calculate a verification digest header by applying the SHA-256 hash function to the payload received in the response. The client application 114 may compare the verification digest header with the digest header included in the response. When the client application 114 determines that the verification digest header is not the same as the digest header included in the response, the client 114 may determine that the response is invalid. In this case, the client application 114 may discard the response and may retransmit a new connection request to the API 106 associated with the VSP control infrastructure 104.

Alternatively, when the client application 114 determines that the verification digest header is the same as the digest header included in the response, the client application 114 may inspect the identifier associated with the encryption algorithm (e.g., RSA-key-1) to determine the version (e.g., version 1) of the public key to be utilized for verifying the signed hashed combined set of alphanumeric characters. The client application 114 may compare the determined version of the public key with a current version of the public key available to the client application 114. In some aspects, the VSP control infrastructure 104 may include an updatable version of the public key in the client application 114. As a result of the comparison, when the client application 114 determines that the version of the public key is not the same as the current version of the public key, the client application 114 may communicate with a public endpoint to update the current version of the public key. In some aspects, the public endpoint may be responsible for providing the latest version of the public key. The client application 114 may update the current version of the public key with the latest version of the public key.

The client application 114 may determine a verification signature header by applying the SHA-256 hash function to a combination of the verification digest header and the timing header. Further, the client application 114 may provide the verification signature header, the public key, and the received signature header as input to the RSA encryption algorithm. The RSA encryption algorithm may process the input and may output a boolean result (e.g., true (1) or false (0)) indicating whether the verification signature header is a match with respect to the received signature header (e.g., whether the private key, associated with the provided public key, when applied to the verification signature header will yield the received signature header). In an example, the RSA encryption algorithm may output a true (1) result when the verification signature header is a match with respect to the received signature header and may output a false (0) result when the verification signature header is not a match with respect to the received signature header. In some aspects, the RSA encryption algorithm may output the false result (0) when the public key is not associated with the private key utilized to sign the received signature header and/or when data associated with the digest header and/or the timing header has been altered. In the case of a false (0) result, the client application 114 may discard the response and may retransmit a new connection request to the API 106 associated with the VSP control infrastructure 104.

Alternatively, when the client application 114 determines that the verification signature header is the same as the signature header included in the response, the client application 114 may determine that all of the one or more custom headers are valid. As a result, the client application 114 may determine that the response is valid as having been received from the API 106 associated with the VSP control infrastructure 104.

Based at least in part on determining that the response is valid, the client application 114 may select a VPN server from the list of VPN servers included in the payload, and may transmit an initiation request to the selected VPN server to establish a VPN connection with the selected VPN server. Based at least in part on establishing the VPN connection, the client application 114 may obtain the VPN services from the selected VPN server.

In this way, by utilizing the header-based authentication discussed herein, the VSP control infrastructure 104 and the user device 102 may mitigate chances of private information associated with the user device 102 from becoming compromised and of malware being introduced to the user device 102. As a result, the user device 102 may avoid expending various user device resources (e.g., processing resources, memory resources, power consumption resources, battery life, or the like) in efforts to mitigate effects of the private information becoming compromised and the malware being introduced to the user device 102.

As indicated above, FIG. 2 is provided as an example. Other examples may differ from what is described with regard to FIG. 2.

FIG. 3 is an illustration of an example process 300 associated with header-based authentication in a VPN, according to various aspects of the present disclosure. In some aspects, the process 300 may be performed by a memory and/or a processor/controller (e.g., processing unit 116, processor 620) associated with a user device (e.g., user device 102) executing a client application and/or a memory and/or a processor/controller (e.g., processing unit 110, processor 620) associated with a VSP control infrastructure (e.g., VSP control infrastructure 104). As shown by reference numeral 310, process 300 may include receiving, at a first processor from a second processor, a connection request for obtaining VPN services. For instance, the VSP control infrastructure may utilize a communication interface (e.g., communication interface 670) and the associated memory and/or processor to receive, from a user device, a connection request for obtaining VPN services, as discussed elsewhere herein.

As shown by reference numeral 320, process 300 may include determining, by the first processor, custom headers including a timing header, an authorization header, a digest header, and a signature header. For instance, the VSP control infrastructure may utilize the associated memory and/or processor to determine custom headers including a timing header, an authorization header, a digest header, and a signature header, as discussed elsewhere herein.

As shown by reference numeral 330, process 300 may include transmitting, by the first processor to the second processor, a response including the custom headers and a payload indicating a VPN server for providing the VPN services. For instance, the VSP control infrastructure may utilize the communication interface (e.g., communication interface 670) and the associated memory and/or processor to transmit, to the user device, a response including the custom headers and a payload indicating a VPN server for providing the VPN services, as discussed elsewhere herein.

As shown by reference numeral 340, process 300 may include transmitting, by the second processor to the VPN server, a request for obtaining the VPN services based at least in part on authenticating the custom headers. For instance, the user device may utilize the communication interface (e.g., communication interface 670) and the associated memory and/or processor to transmit, to the VSP control infrastructure, a request for obtaining the VPN services based at least in part on authenticating the custom headers, as discussed elsewhere herein.

Process 300 may include additional aspects, such as any single aspect or any combination of aspects described below and/or in connection with one or more other processes described elsewhere herein.

In a first aspect, in process 300, authenticating the custom headers includes determining a presence of the custom headers in the response.

In a second aspect, alone or in combination with the first aspect, in process 300, the timing header indicates a point in time or a duration of time associated with a validity of the response.

In a third aspect, alone or in combination with the first through second aspects, in process 300, the authorization header includes an identifier associated with a cryptographic key utilized by the first processor to determine the signature header.

In a fourth aspect, alone or in combination with the first through third aspects, in process 300, the authorization header includes an identifier associated with an encryption algorithm utilized by the first processor to determine the signature header.

In a fifth aspect, alone or in combination with the first through fourth aspects, in process 300, the digest header includes a hash of the payload.

In a sixth aspect, alone or in combination with the first through fifth aspects, in process 300, the signature header includes an encoded combination of the digest header and the timing header, the combination of the digest header and the timing header being signed utilizing a cryptographic key identified in the authorization header.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 400 associated with header-based authentication in a VPN, according to various aspects of the present disclosure. In some aspects, the process 400 may be performed by a memory and/or a processor/controller (e.g., processing unit 116, processor 620) associated with a user device (e.g., user device 102) executing a client application. As shown by reference numeral 410, process 400 may include transmitting, by a processor, a connection request to a VPN service provider for obtaining VPN services. For instance, the user device may utilize the associated memory and/or processor to transmit a connection request to a VPN service provider for obtaining VPN services, as discussed elsewhere herein.

As shown by reference numeral 420, process 400 may include receiving, by the processor, a response including custom headers and a payload indicating a VPN server for receiving the VPN services, the custom headers including a timing header, an authorization header, a digest header, and a signature header. For instance, the user device may utilize an associated communication interface (e.g., communication interface 670) and the associated memory and/or processor to receive a response including custom headers and a payload indicating a VPN server for receiving the VPN services, the custom headers including a timing header, an authorization header, a digest header, and a signature header, as discussed elsewhere herein.

As shown by reference numeral 430, process 400 may include authenticating, by the processor, the custom headers to determine whether the response was transmitted by the VPN service provider. For instance, the user device may utilize the associated memory and/or processor to authenticate the custom headers to determine whether the response was transmitted by the VPN service provider, as discussed elsewhere herein.

As shown by reference numeral 440, process 400 may include transmitting, by the processor to the VPN server, a request for obtaining the VPN services based at least in part on determining that the response was transmitted by the VPN service provider. For instance, the user device may utilize the associated communication interface (e.g., communication interface 670) and the associated memory and/or processor to transmit, to the VPN server, a request for obtaining the VPN services based at least in part on determining that the response was transmitted by the VPN service provider, as discussed elsewhere herein.

Process 400 may include additional aspects, such as any single aspect or any combination of aspects described below and/or in connection with one or more other processes described elsewhere herein.

In a first aspect, in process 400, authenticating the custom headers includes determining a presence of the custom headers in the response.

In a second aspect, alone or in combination with the first aspect, in process 400, authenticating the custom headers includes determining whether the response was received before a point in time indicated by the timing header or within a duration of time indicated by the timing header.

In a third aspect, alone or in combination with the first through second aspects, in process 400, authenticating the custom headers includes determining whether a cryptographic key identified in the authorization header was utilized by the VPN service provider for encryption to determine the signature header.

In a fourth aspect, alone or in combination with the first through third aspects, in process 400, authenticating the custom headers includes determining whether an encryption algorithm identified in the authorization header was utilized by the VPN service provider for encryption to determine the signature header.

In a fifth aspect, alone or in combination with the first through fourth aspects, in process 400, authenticating the custom headers includes calculating a verification digest header and comparing the verification digest header with the digest header received in the response.

In a sixth aspect, alone or in combination with the first through fifth aspects, in process 400, authenticating the custom headers includes calculating a verification signature header and comparing the verification digest header with the signature header received in the response.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with header-based authentication in a VPN, according to various aspects of the present disclosure. In some aspects, the process 500 may be performed by a memory and/or a processor/controller (e.g., processing unit 110, processor 620) associated with a VSP control infrastructure (e.g., VSP control infrastructure 104). As shown by reference numeral 510, process 500 may include receiving, by a processor, a connection request from a user device for obtaining VPN services. For instance, the user device may utilize the associated memory and/or a processor to receive a connection request from a user device for obtaining VPN services, as discussed elsewhere herein.

As shown by reference numeral 520, process 500 may include determining, by the processor based at least in part on receiving the connection request, custom headers including a timing header, an authorization header, a digest header, and a signature header. For instance, the user device may utilize the associated memory and/or processor to determine, based at least in part on receiving the connection request, custom headers including a timing header, an authorization header, a digest header, and a signature header, as discussed elsewhere herein.

As shown by reference numeral 530, process 500 may include transmitting, by the processor to the user device, a response including the custom headers and a payload indicating a VPN server associated with obtaining the VPN services. For instance, the user device may utilize a communication interface (e.g., communication interface 670) and the associated memory and/or processor to transmit, to the user device, a response including the custom headers and a payload indicating a VPN server associated with obtaining the VPN services, as discussed elsewhere herein.

As shown by reference numeral 540, process 500 may include configuring, by the processor, the VPN server to provide the VPN services to the user device. For instance, the user device may utilize the associated memory and/or processor to configure the VPN server to provide the VPN services to the user device, as discussed elsewhere herein.

Process 500 may include additional aspects, such as any single aspect or any combination of aspects described below and/or in connection with one or more other processes described elsewhere herein.

In a first aspect, in process 500, determining the custom headers includes determining the timing header to indicate a point in time or a duration of time associated with authenticating the response by the user device.

In a second aspect, alone or in combination with the first aspect, in process 500, determining the custom headers includes determining the authorization header to include an identifier associated with a cryptographic key utilized by the processor for encryption.

In a third aspect, alone or in combination with the first through second aspects, in process 500, determining the custom headers includes determining the authorization header to include an identifier associated with an encryption algorithm utilized by the processor for encryption.

In a fourth aspect, alone or in combination with the first through third aspects, in process 500, determining the custom headers includes determining the signature header to include a hashed combination of the timing header and the digest header.

In a fifth aspect, alone or in combination with the first through fourth aspects, in process 500, determining the custom headers includes determining the signature header based at least in part on encoding an encrypted hashed combination of the timing header and the digest header.

In a sixth aspect, alone or in combination with the first through fifth aspects, in process 500, determining the custom headers includes determining the signature header based at least in part on encrypting a hashed combination of the timing header and the digest header by utilizing an encryption key identified in the authorization header.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of example devices 600 associated with header-based authentication in a VPN, according to various aspects of the present disclosure. In some aspects, the example devices 600 may form part of or implement the systems, servers, environments, infrastructures, components, devices, or the like described elsewhere herein (e.g., VSP control infrastructure, VPN server, etc.) and may be used to perform example processes described elsewhere herein. The example devices 600 may include a universal bus 610 communicatively coupling a processor 620, a memory 630, a storage component 640, an input component 650, an output component 660, and a communication interface 670.

Bus 610 may include a component that permits communication among multiple components of a device 600. Processor 620 may be implemented in hardware, firmware, and/or a combination of hardware and software. Processor 620 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 620 may include one or more processors capable of being programmed to perform a function. Memory 630 may include a random access memory (RAM), a read only memory (ROM), and/or another type of dynamic or static storage device (e.g., a flash memory, a magnetic memory, and/or an optical memory) that stores information and/or instructions for use by processor 620.

Storage component 640 may store information and/or software related to the operation and use of a device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 may include a component that permits a device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 may include a component that provides output information from device 600 (via, for example, a display, a speaker, a haptic feedback component, an audio or visual indicator, and/or the like).

Communication interface 670 may include a transceiver-like component (e.g., a transceiver, a separate receiver, a separate transmitter, and/or the like) that enables a device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

A device 600 may perform one or more processes described elsewhere herein. A device 600 may perform these processes based on processor 620 executing software instructions stored by a non-transitory computer-readable medium, such as memory 630 and/or storage component 640. As used herein, the term "computer-readable medium" may refer to a non-transitory memory device. A memory device may include memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 6 are provided as an example. In practice, a device 600 may include additional components, fewer components, different components, or differently arranged components than those shown in FIG. 6. Additionally, or alternatively, a set of components (e.g., one or more components) of a device 600 may perform one or more functions described as being performed by another set of components of a device 600.

As indicated above, FIG. 6 is provided as an example. Other examples may differ from what is described with regard to FIG. 6.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method in a virtual private network (VPN) service environment, the method comprising:
   receiving, by a processor, a connection request from a user device for obtaining VPN services;
   determining, by the processor based at least in part on receiving the connection request, custom headers including a timing header, an authorization header, a digest header, and a signature header;
   transmitting, by the processor to the user device, a response including the custom headers and a payload indicating a VPN server associated with obtaining the VPN services; and
   configuring, by the processor, the VPN server to provide the VPN services to the user device.

2. The method of claim 1, wherein determining the custom headers includes determining the timing header to indicate a point in time or a duration of time associated with authenticating the response by the user device.

3. The method of claim 1, wherein determining the custom headers includes determining the authorization header to include an identifier associated with a cryptographic key utilized by the processor for encryption.

4. The method of claim 1, wherein determining the custom headers includes determining the authorization header to include an identifier associated with an encryption algorithm utilized by the processor for encryption.

5. The method of claim 1, wherein determining the custom headers includes determining the signature header to include a hashed combination of the timing header and the digest header.

6. The method of claim 1, wherein determining the custom headers includes determining the signature header based at least in part on encoding an encrypted hashed combination of the timing header and the digest header.

7. The method of claim 1, wherein determining the custom headers includes determining the signature header based at least in part on encrypting a hashed combination of the timing header and the digest header by utilizing an encryption key identified in the authorization header.

8. A device, comprising:
a memory; and
a processor communicatively coupled to the memory, the memory and the processor being configured to:
receive a connection request from a user device for obtaining VPN services;
determine, based at least in part on receiving the connection request, custom headers including a timing header, an authorization header, a digest header, and a signature header;
transmit, to the user device, a response including the custom headers and a payload indicating a VPN server associated with obtaining the VPN services; and
configure the VPN server to provide the VPN services to the user device.

9. The device of claim 8, wherein, to determine the custom headers, the memory and the processor are configured to determine the timing header to indicate a point in time or a duration of time associated with authenticating the response by the user device.

10. The device of claim 8, wherein, to determine the custom headers, the memory and the processor are configured to determine the authorization header to include an identifier associated with a cryptographic key utilized by the device for encryption.

11. The device of claim 8, wherein, to determine the custom headers, the memory and the processor are configured to determine the authorization header to include an identifier associated with an encryption algorithm utilized by the processor for encryption.

12. The device of claim 8, wherein, to determine the custom headers, the memory and the processor are configured to determine the signature header to include a hashed combination of the timing header and the digest header.

13. The device of claim 8, wherein, to determine the custom headers, the memory and the processor are configured to determine the signature header based at least in part on encoding an encrypted hashed combination of the timing header and the digest header.

14. The device of claim 8, wherein, to determine the custom headers, the memory and the processor are configured to determine the signature header based at least in part on encrypting a hashed combination of the timing header and the digest header by utilizing an encryption key identified in the authorization header.

15. A non-transitory computer-readable medium configured to store instructions, which when executed by a processor associated with a device in a virtual private network (VPN) environment, cause the processor to:
receive a connection request from a user device for obtaining VPN services;
determine, based at least in part on receiving the connection request, custom headers including a timing header, an authorization header, a digest header, and a signature header;
transmit, to the user device, a response including the custom headers and a payload indicating a VPN server associated with obtaining the VPN services; and
configure the VPN server to provide the VPN services to the user device.

16. The non-transitory computer-readable medium of claim 15, wherein, to determine the custom headers, the processor is configured to determine the timing header to indicate a point in time or a duration of time associated with authenticating the response by the user device.

17. The non-transitory computer-readable medium of claim 15, wherein, to determine the custom headers, the processor is configured to determine the authorization header to include an identifier associated with a cryptographic key utilized by the device for encryption.

18. The non-transitory computer-readable medium of claim 15, wherein, to determine the custom headers, the processor is configured to determine the authorization header to include an identifier associated with an encryption algorithm utilized by the processor for encryption.

19. The non-transitory computer-readable medium of claim 15, wherein, to determine the custom headers, the processor is configured to determine the signature header to include a hashed combination of the timing header and the digest header.

20. The non-transitory computer-readable medium of claim 15, wherein, to authenticate the custom headers, the processor is configured to determine the signature header based at least in part on encoding an encrypted hashed combination of the timing header and the digest header.

* * * * *